Figure 1:
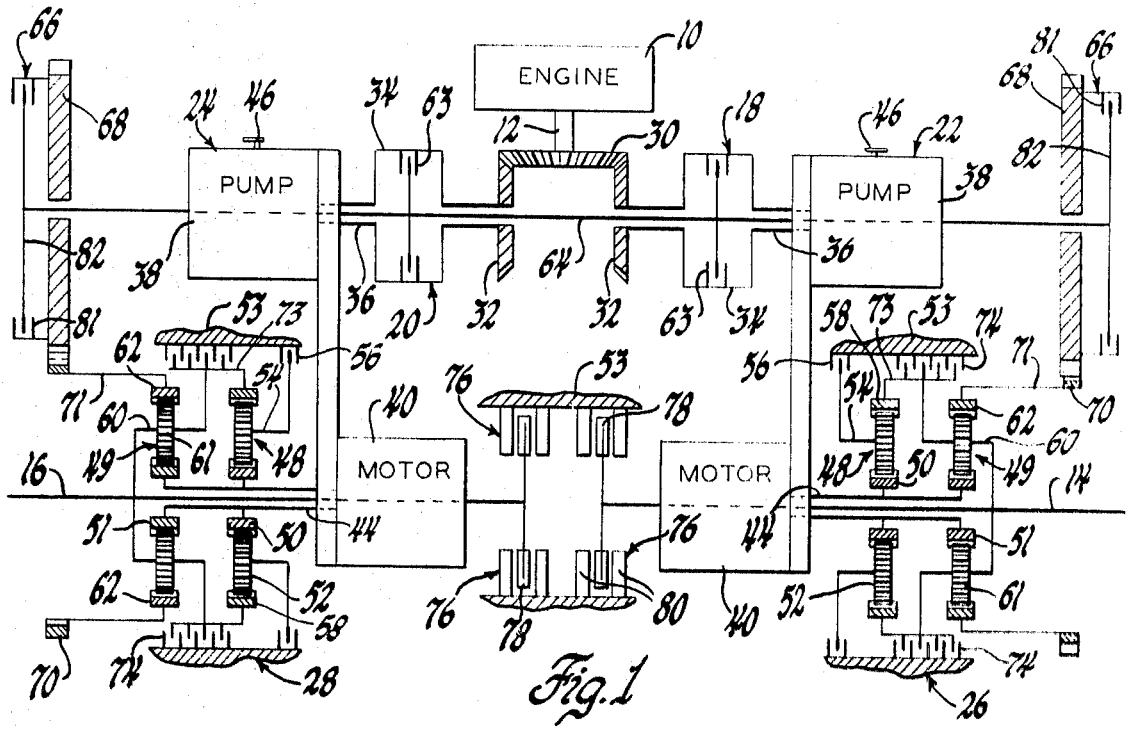

United States Patent

[11] 3,590,658

| | | |
|---|---|---|
| [72] | Inventor | Robert M. Tuck<br>Indianapolis, Ind. |
| [21] | Appl. No. | 671,464 |
| [22] | Filed | Sept. 28, 1967 |
| [45] | Patented | July 6, 1971 |
| [73] | Assignee | General Motors Corporation, Detroit, Mich.<br>Continuation of application Ser. No. 502,863, Oct. 23, 1965, now abandoned. |

[54] POWER TRAIN
8 Claims, 4 Drawing Figs.

[52] U.S. Cl. ................................................. 74/687,
74/720.5
[51] Int. Cl. ....................................................... F16h 47/04
F16h/37/06
[50] Field of Search............................................ 74/687,
720.5

[56] References Cited
UNITED STATES PATENTS

| | | | |
|---|---|---|---|
| 1,984,830 | 12/1934 | Higley | 74/720.5 X |
| 3,039,327 | 6/1962 | Breting | 74/720.5 |
| 3,199,376 | 8/1965 | Delalio | 74/687 X |
| 3,306,129 | 2/1967 | Delalio | 74/687 |
| 3,383,952 | 5/1968 | Christenson | 74/687 X |
| 3,433,045 | 3/1969 | Tuck | 74/687 |

*Primary Examiner*—Donley J. Stocking
*Assistant Examiner*—Thomas C. Perry
*Attorneys*—E. W. Christen and A. M. Heiter ABSTRACT: A power train having an infinitely variable ratio hydrostatic drive combined with planetary gearing to provide a full hydrostatic drive in a low-drive range and at least one hydromechanical drive in a higher drive range with synchronous drive-establishing device shifting between the drives. In the planetary gearing there is a pair of planetary gear sets having like gear members driven by the hydrostatic drive with the ring gear member of one gear set having selective mechanical input drive for the high-drive range. An added hydromechanical drive is made available by selective mechanical input drive to the carrier of the other gear set. A dual output power train arrangement is provided by a forward and reverse input drive to two of the above described drive arrangements to provide separate power train outputs whereby there are provided the same drives in forward and reverse and, in addition, steering is available by establishing a speed differential between the two outputs.

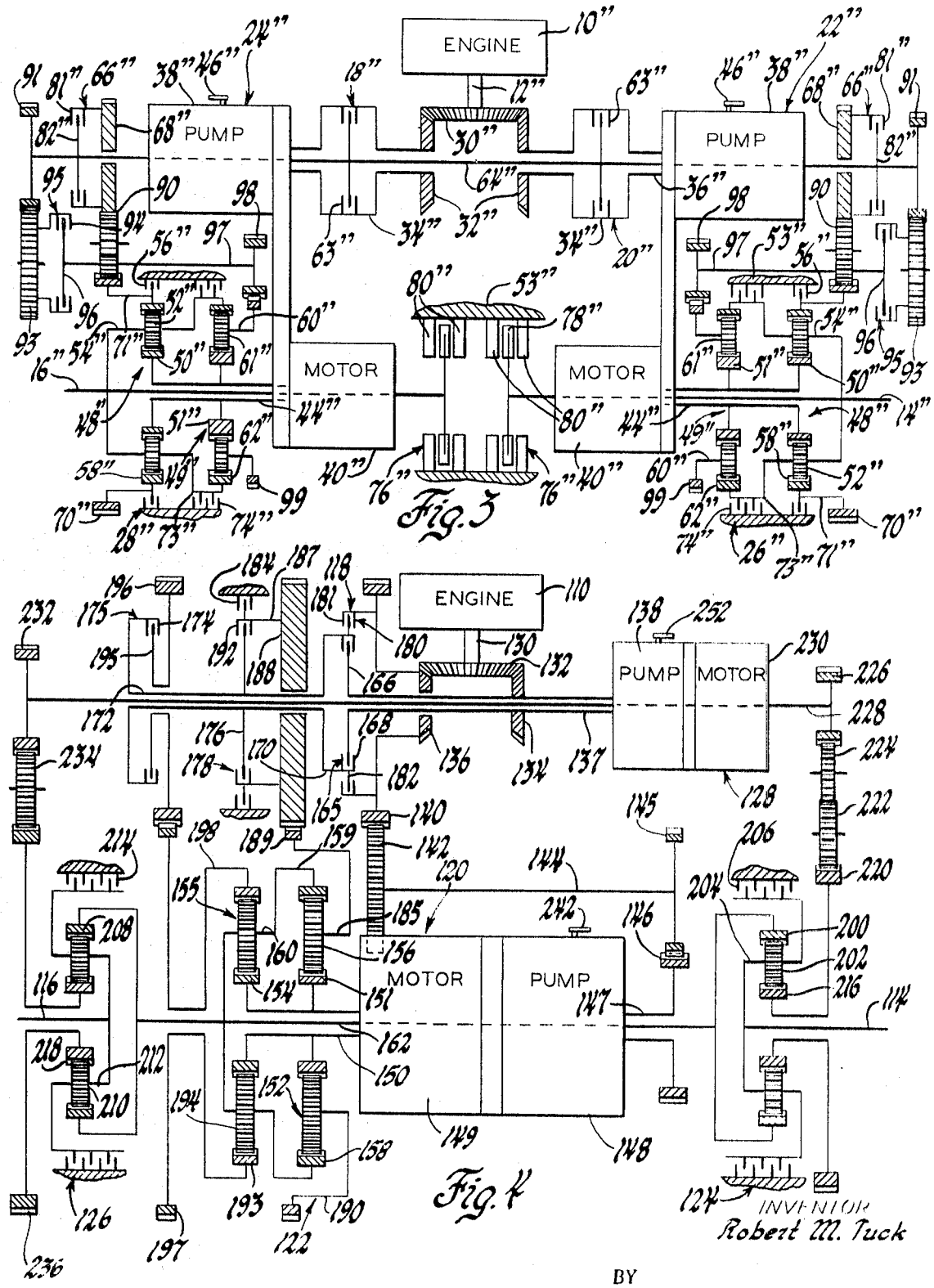

3,590,658

POWER TRAIN

This application is a continuation of Ser. No. 502,863 filed Oct. 23, 1965, now abandoned.

This invention relates to power trains and more particularly to a single input, single- and dual-output power train providing full hydrostatic drive and hydromechanical drive.

It is advantageous that the power train for connecting a prime mover to a vehicle's propelling devices, which may be single output for on-the-road vehicles and by dual output for off-the-road vehicles such as track-laying vehicles, be capable of providing an infinitely variable and efficient drive in a plurality of drive ranges and with synchronized range shifts. In track-laying vehicles the power train connecting the prime mover to the tracks provides both a propulsion and a steering system which propulsion system has advanced from a purely mechanical system to an automatic full-power shifting system to a split torque drive system. In the evolution of the steering system there has been advancement from a clutch brake and controlled differential steering system to geared steering to multiple ratio differential systems to hydrostatic differential steering. While the above systems proved generally satisfactory they are generally not tailored to meet today's standards of vehicle speed and load, efficiency and degree of maneuverability.

The principle of this invention lies in the use of hydrostatic drive for propulsion as well as steering which hydrostatic drive is the only propulsion drive in the lowest drive range with forward and reverse drive being fully accomplished within the hydrostatic drive units and with the hydrostatic drive combining with planetary gearing in higher drive ranges to provide a hydromechanical drive with the range shifting being accomplished by clutch engagement through synchronous clutch operation at maximum hydrostatic motor speed in each drive range. The hydrostatic drive in each drive range also provides for infinitely variable steer ratios by hydrostatically and independently controlling each track speed and there is also provided hydrodynamic and mechanical braking in series for more effective vehicle braking.

The invention is illustrated in one embodiment in a power train for a track-laying vehicle having a prime mover connected by an input shaft to drive the pump of a pair of hydrostatic drive units, each hydrostatic drive unit having its motor connected by a power-combining planetary gear unit to one power train output shaft, there also being provided a mechanical drive from the input shaft to each power-combining gear unit. In a low-drive range both hydrostatic units are powered by the input and each power combining gear unit, which comprises a pair of planetary gear sets, has power from the associated motor transferred to one of its two sun gears. In each gear unit the reaction ring gear of one of the gear sets is held by a low brake and the drivingly associated carrier which is connected to the output shaft acts to drive the output shaft. Forward and reverse direction of the output shafts is obtained hydraulically in the low-drive range by changes in pump displacement and full hydrostatic drive is obtained throughout low-range operation regardless of direction. When maximum displacement of the pumps occurs, the low brakes are disengaged in the gear units and high clutches in the mechanical drives to the gear units are engaged. At this time the speeds of the high-clutch components are synchronized by their driven clutch-member drive connections through the associated gear unit to the associated motor and thus no clutch plate slippage of shift shock occurs. With the high clutches engaged the input power is divided with the power being delivered hydrostatically by the hydrostatic units to the power-combining gear units and the remainder being delivered mechanically by the high clutches to the gear units. The hydrostatic power drives the sun gear and the mechanical power drives the ring gear of the other gear sets to drive the associated carrier and connected output shaft with output shaft direction being determined in the mechanical drive by engagement of either a forward or reverse drive provided between the input shaft and both the high clutches. Steering is accomplished in all drive ranges by either independently or simultaneously controlling the hydrostatic drive units to control the speed of each output shaft.

An object of this invention is to provide a new and improved single-input single-output power train providing full hydrostatic drive and hydromechanical drive.

Another object of this invention is to provide a new and improved single-input, dual-output power train providing full hydrostatic drive, hydromechanical drive and hydrostatic steering operation.

Another object of this invention is to provide in a single-input, dual-output power train, a full hydrostatic drive through independent, infinitely variable hydrostatic drive units to separate outputs and hydromechanical drive by the hydrostatic drive and planetary gearing with the mechanical drive being accomplished by synchronized clutch engagement.

Another object of this invention is to provide in a power train, full hydrostatic drive to an output in a low-drive range and a new and improved hydromechanical drive to the output in a higher drive range with range shifting synchronized at constant hydrostatic output drive speed.

Another object of this invention is to provide a power train having full hydrostatic drive and also a combined hydrostatic and planetary gear drive with synchronized range shifts at equal speeds in forward and reverse for allowing the prime mover to operate at its optimum speed and torque condition for any given load at the output.

Another object of this invention is to provide a power train having full hydrostatic drive and hydromechanical output split torque drive with mechanical input to a ring gear and with the full hydrostatic drive being conditionable for forward and reverse drive and the hydromechanical drive being established by a clutch synchronized for engagement at maximum hydrostatic motor speed in all drive ranges.

Another object of this invention is to provide in a power train a speed differential gear unit for driving an output shaft with single-input drive and also for driving the output shaft with dual-input drives, an infinitely variable hydrostatic drive for transmitting power from the input shaft to the gear unit to provide the one-input drive and mechanical drives for selectively and alternately transmitting power from the input shaft to a carrier and a ring gear in the gear unit for cooperating with the one-input drive to provide the dual-input drives and the mechanical drives including synchronous drive-establishing clutches.

These and other objects of the invention will be more apparent from the following description and drawing of the preferred embodiments of the invention in which:

FIG. 1 diagrammatically shows a power train constructed according to this invention.

Figure 2:
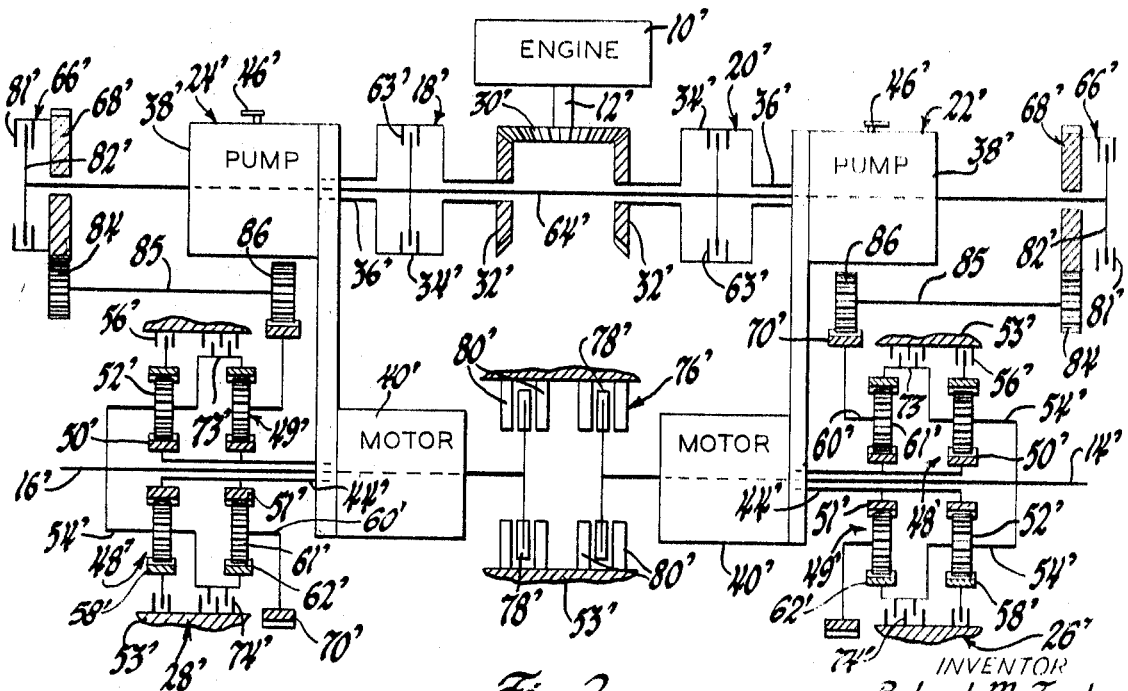

FIG. 2 diagrammatically shows another embodiment of the power train.

FIG. 3 diagrammatically shows another embodiment of the power train.

FIG. 4 diagrammatically shows another embodiment of the power train.

FIGURE 1 EMBODIMENT

Referring first to FIG. 1, the invention is illustrated in one embodiment in a track-laying vehicle power train powered by a prime mover 10 and generally comprising a prime mover driven shaft 12 operatively connected to a right- and a left-track-powering output shaft 14, 16 respectively by a common forward-drive clutch unit 18, a common reverse-drive clutch unit 20 and a right and a left hydrostatic pump and motor unit 22, 24 respectively and a right and a left power-combining or speed differential planetary gear unit 16, 28 respectively. The longitudinal central axis of prime mover 10 and of input shaft 12 is arranged longitudinal of the vehicle to provide what is referred to as a "T" input drive for the power train which has the longitudinal central axis of each component 14, 16, 18, 20, 22, 24, 26 and 28 arranged to be transverse of the vehicle, output shafts 14, 16 being axially aligned.

Since the drive clutch units 18 and 20 are similar, the hydrostatic pump and motor units 22 and 24 are similar and the power-combining planetary gear units 26 and 28 are similar, the following description of one unit applies to the other similar and central axis aligned unit. Input to both hydrostatic units is provided by the input shaft 16 being connected to drive a bevel gear 30 which meshes with a pair of opposed bevel gears 32, the axes of gears 30 and gears 32 being at right angles. Each gear 32 is connected by the clutch drum 34 of one drive clutch unit to an input sleeve shaft 36 for the hydrostatic pump 38 of each hydrostatic unit which pump is operatively connected hydraulically to its associated hydrostatic motor 40. Each hydrostatic unit is of conventional design with the pump having an infinitely variable displacement and the motor having a fixed displacement, the speed and direction of the motor output shaft 44 being controlled by a pump displacement control mechanism operated by a control 46. It will be understood that with the variable displacement pump 38, the output motor speed from zero to a maximum positive speed in one direction and a maximum negative speed in the other direction is obtained with constant power output on controlling the displacement of the pump by control 46 while pump input speed remains constant.

Each power-combining planetary gear unit has a pair of planetary gear sets 48, 49 having a sun gear 50, 51 respectively connected to the motor output shaft 44. The sun gear 50 meshes with a plurality of planetary pinions 52 carried on a carrier 54 which is grounded to the gear unit housing 53 on engagement of a low-drive-establishing brake 56. The pinions 52 mesh with a ring gear 58 which is connected by a drum 73 and the carrier 60 of the other gear set 49 to the associated output shaft. The other sun gear 51 meshes with pinions 61 carried by carrier 60 which pinions mesh with a ring gear 62 which is mechanically driven in a manner now to be described.

Mechanical drive to each power-combining gear unit is by either the forward-drive clutch unit 18 or reverse-drive clutch unit 20, each clutch unit having a friction clutch plate assembly 63 for connecting its clutch drum 34 to a common power transfer shaft 64 parallel with output shafts 14, 16. Shaft 64 extends freely through each gear 32, each sleeve shaft 36 and each pump 38 and is connected at each of its outboard ends on engagement of a high-drive-establishing clutch 66 to a spur gear 68 rotatable about the outboard end of shaft 64. Spur gear 68 meshes with a spur gear 70 rotatable about the outboard end of the associated output shaft which latter gear is connected by a drum 71 to the ring gear 62 to complete the mechanical drive to each planetary gear unit.

There is provided hydrodynamic and mechanical braking in series for each output shaft with each mechanical brake 74 being integrated for compactness into each gear unit by being connected to brake the output shaft through the carrier 60. Each of the hydrodynamic brakes 76 comprises a vaned rotor 78 operating between grounded vanes 80. Rotor 78 is connected to an inboard extension of the output shaft extending freely through sleeve shaft 44 and motor 40. The brakes 76 are of conventional design and on entry of oil into the cavity between the stationary vanes provide resistance to the rotor and thus to the connected output shaft so that hydrodynamic and engine braking are thus available to satisfy normal braking requirements and additional mechanical braking is available for severe braking duty.

Describing now the operation of the power train, in neutral the low-drive brakes and the high-drive clutches are released to disconnect both the hydrostatic and mechanical power flow paths from the output shafts. Thus, in neutral the hydrostatic pumps are motored by the prime mover 10 without transmitting power to the output shafts and are available for subsequent establishment of the drive ranges.

In the low-drive range either the forward-drive clutch 18 or the reverse-drive clutch 20 is engaged for reasons which will become more apparent later and the high-drive clutches 66 are disengaged to disconnect the mechanical drive paths. Both the low-drive brakes 56 are engaged in the low-drive range to hold the carriers 54 and the motor shafts 44 are driven by simultaneous control of the hydrostatic units by their control 46 to drive the sun gear 50 of each gear unit in the same direction and at the same speed from zero to maximum motor speed. With the sun gear 50 driven in one direction and the carrier 54 held, the ring gear 58 and connected output shaft are caused to rotate in the opposite direction at a reduced speed with the full hydrostatic drive thus provided.

During operation in the low-drive range, the other sun gear 51 is rotating at motor speed in the one direction and the carrier 60 is rotating at output speed in the opposite direction and these rotations combine in the gear set 49 to cause the ring gear 62 to rotate at an intermediate speed in the opposite direction. The ratios of the planetary gearing (gear sets 48, 49), the gearing between ring gear 62 and high-clutch driven member 81 (gears 70, 68) and the gearing between input shaft 12 and high-clutch driving member 82 (gears 30, 32) are determined so that when the motor speed reaches its maximum value in the one direction, the high-clutch driving member 81 of the disengaged high-drive clutches 66 is driven at the same speed and in the same direction as the high-clutch driving member 82 when shaft 64 is driven in the same direction as the motor shafts.

Thus, when the motor shafts are driven, in what will be described as the reverse direction, the output shafts are driven in the forward direction and the high-clutch members are driven in the reverse direction and vice versa. Accordingly, for a low-forward drive the hydrostatic units are conditioned to power the motor shafts in the reverse direction and for a low-reverse drive the hydrostatic units are conditioned to power the motor shafts forwardly. In low-forward drive the forward-drive clutch unit 18 is engaged to rotate the shaft 64 and connected high-clutch driving members 82 in the reverse direction to condition the high-drive clutches 66 for a subsequent upshift in forward drive. Similarly, in low-reverse drive the reverse-drive clutch unit 20 is engaged to rotate the shaft 64 and connected high-clutch-driving members 82 in the forward direction to condition the high-drive clutches 66 for a subsequent upshift in reverse drive.

The shift from low- to high-drive range in forward and reverse is accomplished when the above synchronous conditions of rotational high-drive clutch member speed are reached in low-forward drive and low-reverse drive respectively. The low-drive-establishing brakes 56 are released and the high-drive clutches 66 are then engaged and the gear sets 48 become passive since they have no reaction. The mechanical drive and hydrostatic drive are now combined in each gear set 49 and by the arrangement of the drive connections of each gear set 49, the direction of rotation of the motor that drives the sun gear 51 is opposite the direction of rotation of the ring gear 62 and the carrier connected output shaft and therefore the motor drive subtracts from the drive of output carrier 60 at the initiation of and at the lowest output shaft speed in high drive. Thus, output shaft speed in high forward range with forward-drive clutch unit 18 engaged is accordingly increased by reducing the motor speed to zero to maximum motor speed in the forward direction. Similarly, the output shaft speed in the high-reverse drive range with reverse-drive clutch unit 20 engaged is increased by reducing motor speed from maximum reverse speed to zero to maximum forward speed. Thus, in the high-forward and high-reverse drive range no hydraulic torque and therefore 100 percent mechanical torque is transmitted at zero motor speed, which full mechanical drive is desirable for operating efficiency.

Downshifting from high- to the low-drive range in forward or reverse also occurs at maximum motor speed with a similar synchronous condition in each low-drive brake 56 occurring just prior to engagement since each carrier 54 will be brought to rest by the combined drives of sun gear 50 and the ring gear 58 which is connected to and driven by the output carrier 60 of gear set 49 in the high-drive range. Accordingly, the low-drive brakes 56 will be synchronized for a downshift to low-forward drive and low-reverse drive at maximum reverse motor speed in high-forward drive and maximum forward motor speed in high-reverse drive respectively.

Thus, the speeds of the low- and high-drive-establishing devices are synchronized to provide for smooth power transition with no abrupt ratio change, friction plate slippage nor shift shock. In addition, the synchronized range shifts avoid abrupt changes in operating stroke and/or speed and direction of rotation of the hydrostatic units and the same steering characteristics are maintained through a range shift since there is no instantaneous ratio change causing a change in the turning radius on shifting between ranges. Furthermore, the full hydrostatic drive providing for infinitely variable hydrostatic propulsion drive in low can be changed from forward to reverse drive without engaging or disengaging a friction drive-establishing device. In addition, the hydrostatic drives allow the prime mover to operate at its optimum speed and torque condition for any given load at the output shafts which is particularly desirable for diesel engines. The hydrostatic drives also permit the use of a constant engine speed which is a necessary requirement of certain types of gas turbine engines.

Steering in both the low- and the high-drive ranges is accomplished by either independent control of each hydrostatic unit to increase or decrease output shaft speed on one side or by simultaneous control of both hydrostatic units to increase output shaft speed on one side and correspondingly decrease output shaft speed on the other side. The independent speed control and direction of each output shaft provide capabilities of turn at any speed within the vehicle's capabilities for negotiating turns and provide true pivot steer about the vehicle's center when desired which would occur when the output shafts are driven in opposite directions at the same speed.

FIGURE 2 EMBODIMENT

The power train embodiment shown in FIG. 2 is similar to the FIG. 1 arrangement but has its power-combining gear units arranged to provide synchronized shifting conditions for the high-drive clutches at lower speeds so that the more efficient split-torque high drive is available over a wider vehicle speed range. The FIG. 2 power train embodiment has like numerals but primed for identifying the corresponding parts shown in FIG. 1 and new numerals for added parts. In the FIG. 2 embodiment the gear set 48' of each gear unit is relocated outboard of the associated gear set 49' and has its carrier 54' connected to the associated output shaft and its ring gear 58' connected to the low-drive brake 56' for more torque ratio. The low-drive brake 56' is relocated outboard of the mechanical brake 74' which is now connected to brake the output shaft through the drum 73' and the carrier 54'.

Mechanical drive to each gear set 49' is provided by reversing the location of drive units 18' and 20' to provide the desired direction of rotation of shaft 64' in the mechanical path as will be seen later, relocating the gear 70' inboard of gear set 49' and connecting gear 70' to this gear set's carrier 60'; the ring gear 62' now being connected by the drum 73' and carrier 54' to the output shaft. The gear 68', which is connected to the driven high-clutch member 81', meshes with a gear 84 attached to a countershaft 85. Shaft 85 is attached to a gear 86 which meshes with gear 70' and thus the gear 70' and connected carrier 60' will rotate in the same direction as gear 68' and connected high-clutch driven member 81'.

Describing now the operation of the FIG. 2 embodiment, in the low-drive range either the forward clutch unit 18' or the reverse clutch unit 20' is engaged and the high-drive clutches 66' are disengaged like in the FIG. 1 embodiment. Both low brakes 56' are engaged to hold the ring gear 58' of gear sets 48' and the hydrostatic units 22' and 24' are conditioned by their control 46' to drive the sun gears 50' forwardly for forward drive and in reverse for reverse drive. The pinions 52' walk around inside their ring gears 58' causing the carrier 54' and connected output shaft to rotate in the same direction as the driving sun gear but at a reduced speed.

During operation in the low range, each sun gear 51' is rotating at motor speed and each ring gear 62' is rotating at output speed in the same direction and these rotations combine in gear set 49' to cause the carrier 60' to rotate in the same direction at an intermediate speed. The ratios of the planetary gearing (gear sets 48', 49'), the geared drive between the carrier 60' and the high-clutch driven member 81' (gears 70', 86, 84, 68) and the geared drive between the input shaft 12' and high-clutch driving member 82' (gears 30', 32') are determined so that when the motors 40' reach their maximum speed in the forward direction with forward-drive unit 18' engaged and in the reverse direction with reverse-drive unit 20' engaged, the high-clutch members 81' and 82' are rotating in the same direction at the same speed.

In the FIG. 2 embodiment the shift from low- to high-range in either forward or reverse is accomplished when the above condition of rotational high-drive clutch member speed is reached by releasing low brakes 56' and engaging the high-drive clutches 66'. Each gear set 48' becomes passive since it has no reaction and the mechanical and hydrostatic drives are now combined in each gear set 49'.

In forward drive with forward-drive unit 18' engaged to rotate shaft 64' forwardly, the forward rotation of the motors driving sun gears 51' subtracts from the forward drive of ring gears 62' and their connected output shafts. Similarly, in reverse drive with reverse-drive unit 20' engaged to rotate shaft 64' in reverse, the reverse rotation of the motors subtracts from the reverse drive of the output shafts. Thus, in high drive, output shaft speed is increased by reducing motor speed through zero to maximum reverse speed in forward drive and to maximum forward speed in reverse drive. Downshifting in the FIG. 2 power train embodiment also occurs with synchronous conditions in each low brake 56' by the drive to each ring gear 58' in high drive.

Steering is provided by the FIG. 2 embodiment in the same manner as the FIG. 1 embodiment.

With the same planetary gear ratios the FIG. 2 arrangement provides more torque ratio in low than the FIG. 1 arrangement and the FIG. 2 motor speeds are reduced in the high-drive range in comparison with the FIG. 1 motor speeds since the FIG. 2 arrangement has the mechanical drive to the carrier of gear set 49' whereas the FIG. 1 arrangement has the mechanical drive to the ring gear of this gear set. Thus, motor leakage is reduced to increase the drive efficiency. Accordingly, operation in the most generally used high-drive range in the FIG. 2 arrangement is more efficient since the motors will be working at lower and more efficient speeds.

FIGURE 3 EMBODIMENT

The power train embodiment shown in FIG. 3 incorporates the features of the FIG. 2 arrangement and adds another range to the two drive ranges of the FIG. 2 embodiment to provide a three-speed power train arrangement with full hydrostatic low-drive range operation and split torque in the intermediate range and the high range. The FIG. 3 power train embodiment has like numerals but double primed for identifying corresponding parts shown in FIG. 1 and new numerals for added parts. In the FIG. 3 embodiment the gear set 48" of each gear unit is relocated outboard of the associated gear set 49" and has its carrier 54" connected to the associated output shaft and its ring gear 58" connected to the low-drive brake 56" like in the FIG. 2 embodiment. The low-drive brake 56" is relocated outboard of the mechanical brake 74" which is connected to brake the output shaft through the drum 73" and the carrier 54".

Mechanical drive is now selectively provided to both the gear sets 48", 49" in each gear unit, the location of drive units 18" and 20" being reversed like in the FIG. 2 embodiment to provide the desired direction of rotation of shaft 64". In the high-clutch drive the gear 70" is now connected by the drum 71" to the ring gear 58" of gear set 48" and there is interposed an idler gear 90 between and in mesh with gears 70" and 68". An intermediate-clutch drive is now provided from the shaft 64" to the carrier 60" of each gear set 49" by the shaft 64" being extended past each high clutch 66" to connect to a spur gear 91. Gear 91 meshes with a gear 93 connected to drive the clutch driving member 94 of an intermediate drive-establishing clutch 95. The intermediate-clutch driven member 96 is connected to a countershaft 97 which at its inboard end is connected to a spur gear 98. Spur gear 98 meshes with a spur gear 99 which is connected to drive the carrier 60", the FIG. 3 intermediate-drive range being similar to the FIG. 2 high-drive range.

Describing now the operation of the FIG. 3 embodiment, in the low-drive range either the forward clutch unit 18" or the reverse clutch unit 20" is engaged and both the intermediate-drive clutches 95 and both the high-drive clutches 66" are disengaged. Both low brakes 56" are engaged to hold the ring gear 58" of gear sets 48" and the hydrostatic units 22" and 24" are conditioned by their control 46" to drive the sun gears 50" forwardly for forward drive and in reverse for reverse drive. The pinions 52" walk around inside their ring gears 58" causing the carrier 54" and connected output shaft to rotate in the same direction as the driving sun gear but at a reduced speed.

During operation in the low range each sun gear 51" is rotating at motor speed and each ring gear 62" is rotating at output speed in the same direction and these rotations combine in each gear set 49" to cause the carrier 60" to rotate in the same direction at an intermediate speed. The ratios of the planetary gearing (gear sets 48", 49"), the geared drive between the carrier 60" and intermediate-clutch driven member 96 (gears 99, 98) and the geared drive between input shaft 12" and intermediate-clutch driving member 94 (gears 30", 31", 91, 93) are determined so that when the motors 40" reach maximum speed in the forward direction with forward-drive unit 18" engaged and in the reverse direction with reverse-drive unit 20" engaged, the intermediate-clutch members 94, 96 of each intermediate clutch 95 are rotating in the same direction at the same speed.

In the FIG. 3 embodiment the shifting from low to intermediate range in either forward or reverse is accomplished when the above condition of rotation intermediate-drive clutch member speed is reached by releasing low brakes 56" and engaging the intermediate-drive clutches 95. Each gear set 48" becomes passive since it has no reaction and the mechanical and hydrostatic drives are now combined in each gear set 49". In forward drive with forward-drive unit 18" engaged the forward rotation of the motors driving sun gears 51" subtracts from the forward rotation of ring gears 62" and their connected output shafts. Similarly, in reverse drive with reverse-drive unit 20" engaged the reverse rotation of the motors subtracts from the reverse rotation of the output shafts. Thus, in intermediate drive, output shaft speed is increased by reducing the motor speed through zero to maximum reverse speed in forward drive and to maximum forward speed in reverse drive. Downshifting from intermediate to low in either forward or reverse in the FIG. 3 embodiment also occurs with synchronous condition in each low-drive brake 56" by the drive to each ring gear 58" in intermediate drive.

During intermediate-range operation each sun gear 50" is rotating at motor speed and each carrier 54" is rotating at output speed and in the same direction as the connected output shaft. These rotations combine in gear set 48" to cause the ring gear 58" to rotate in the same direction as the driven output shaft and at an intermediate speed. The ratios of the planetary gearing (gear sets 48", 49"), the geared drive between the ring gear 58" and high-clutch driven member 81" (gears 70", 90, 68") and the geared drive between the input shaft 12" and the high-clutch driving member 82" (gears 30", 32") are determined so that when the motors 40" reach their maximum speed in the reverse direction with forward-drive unit 18" engaged and in the forward direction with reverse-drive unit 20" engaged, the high-clutch members 81", 82" of each high clutch 66" are rotating in the same direction at the same speed.

In the FIG. 3 embodiment the shift from intermediate to high range in either forward or reverse is accomplished when the above conditions of rotational high-drive clutch member speed is reached by releasing the intermediate-drive clutches 95 and engaging the high-drive clutches 66". In forward drive with the forward-drive unit 18" engaged, reverse rotation of the motors driving sun gears 50" subtracts from the forward drive of carriers 54" and their connected output shafts. Similarly, in reverse drive with reverse-drive unit 20" engaged the forward rotation of the motors subtracts from the reverse drive of the output shafts. Thus, in high drive the output shaft speed is increased by reducing motor speed through zero to maximum forward speed in forward drive and to maximum reverse speed in reverse drive. Downshifting from high to intermediate drive in the FIG. 3 embodiment also occurs with synchronous condition in each intermediate drive clutch 95 by the drive to each ring gear 62" in high drive.

Steering is provided by the FIG. 3 embodiment in the same manner as the FIG. 1 embodiment in all drive ranges.

The FIG. 3 embodiment provides the same advantage over FIG. 1 of more torque ratio in the low range as does the FIG. 2 embodiment, the FIG. 2 and 3 embodiments being the same in low range. The FIG. 3 embodiment has an advantage over the FIG. 2 embodiment since there are two mechanical ranges for the same coverage and 100 percent mechanical torque occurs at zero motor speed in both intermediate and high to provide better performance (efficiency).

FIGURE 4 EMBODIMENT

The power train embodiment shown in FIG. 4 like the FIG. 3 embodiment provides the same three drive ranges in forward and reverse with full hydrostatic drive in low range and split torque drive in intermediate and high range. Propulsion is accomplished in the FIG. 3 embodiment by a single hydrostatic pump and motor unit in combination with planetary gearing while steering is obtained with a steer hydrostatic pump and motor unit combined with the gearing, steering being of the controlled differential type. Referring to FIG. 4 prime mover 110 is operatively connnected to the right- and left-track-powering output shafts 114, 116 respectively by an integrated forward- and reverse-drive clutch assembly 118, a single hydrostatic pump and motor or propulsion unit 120, a common power combining planetary gear unit 122 and a right and a left speed differential or steer planetary gear unit 124, 126. A single hydrostatic pump and motor or steer unit 128 is combined with the steer units 124, 126 for steering operation.

Input to the propulsion unit 120 and the steering unit 128, which hydrostatic units may be of the form in FIGS. 1 to 3, is provided by the prime mover output shaft 130 being connected to drive a bevel gear 132. Gear 132 meshes at diametrically opposite sides with a bevel gear 134 and a bevel gear 136. Gear 134 is connected by a sleeve shaft 137 to the infinitely variable displacement pump 138 of unit 128 whereby the pump is continuously driven by the prime mover. The opposite gear 136 is connected to drive a spur gear 140 which is located concentric with gear 136 and meshes with a spur gear 142. Gear 142 is connected to drive a countershaft 144 which shaft is connected to drive a spur gear 145 in mesh with a spur gear 146. Gear 146 is connected by a sleeve shaft 147 to drive the pump 148 of propulsion unit 120 and thus the pump 148 is continuously powered by the prime mover.

Describing the propulsion drive in further detail, the fixed displacement, propulsion motor 149 powered by infinitely variable displacement pump 148 is connected by a sleeve shaft 150 to the sun gear 151 of gear set 152 and also to the sun gear 154 of gear set 155. In gear set 152 pinions 156 mesh with sun gear 151 and with a ring gear 158 which is connected by a drum 159 and the carrier 160 of gear set 155 to a propulsion output shaft 162. Shaft 162 extends freely through sleeve shaft 150, motor 149, pump 148 and the pump sleeve shaft 147 and is connected at its opposite ends to the steer units 124, 126.

Mechanical drive to the power-combining propulsion gear unit 122 is provided by the forward- and reverse-drive assembly 118 and three drive range clutches located between assembly 118 and unit 122. The forward and reverse assembly 118 comprises a forward-drive clutch 165 whose clutch driving member 166 is connected to be driven by gear 134 by an extension of sleeve shaft 137 which extends freely through gear 136. The forward-clutch driven member 168 is connected by a drum 170 to drive a sleeve shaft 172 which shaft is connected to drive the clutch driving member 174 of an intermediate-drive-establishing clutch 175 and the clutch driving member 176 of a high-drive-establishing clutch 178. A reverse-drive clutch 180 in assembly 118 is located outward of and concentric with forward-drive clutch 165 and has its clutch driving member 181 connected by the gear 140 to the gear 136 and thus is driven in a direction opposite the clutch driving member 166 of the forward drive clutch 165. The reverse clutch driven member 182 is connected by drum 170 to drive the shaft 172 and thus the clutch driving member 174 of the intermediate-drive clutch 175 and the high-drive clutch 178. A low brake 184 is connected to brake the carrier 185 supporting the pinions 156 in gear set 122 by being connected by a drum 187 to a spur gear 188 rotatable about shaft 172. Gear 188 meshes with a gear 189 which is connected by a drum 190 to carrier 185. The driven clutch plate member 192 of the high-drive clutch 178 is also connected to the drum 187 and thus to the carrier 185. The intermediate-clutch drive goes to the ring gear 193 of gear set 155 which ring gear is in mesh with pinions 194 carried by the output carrier 160, the pinions also being in mesh with sun gear 154. In this intermediate-clutch drive, the intermediate-clutch driven member 195 is connected to drive a spur gear 196 which is rotatable about shaft 172 and in mesh with a spur gear 197 rotatable about shaft 162. Gear 197 is connected by a drum 198 to ring gear 193.

In the drives to the output shafts the right-hand end of shaft 162 is connected to drive ring gear 200 of the right steer unit 124 which ring gear meshes with pinions 202 journaled on an output carrier 204 connected to the output shaft 114. A vehicle brake 206 is connected to brake the right output shaft 114 through the carrier 204. Similarly, the left-hand end of shaft 162 is connected to drive ring gear 208 of the left steer unit 126 which ring gear meshes with pinions 210 journaled on an output carrier 212 connected to drive the left output shaft 116 which is axially aligned with the right output shaft 114. A vehicle brake 214 is connected to brake the left output shaft 116 through the carrier 212. The sun gear 216 of the right steer unit 124 and the sun gear 218 of the left steer unit 126 are connected by a direction-reversing gear train. This gear train has at its right end a spur gear 220 connected to sun gear 216 and in mesh with an idler gear 222 which meshes with another idler gear 224. Gear 224 meshes with a gear 226 which is connected to the right end of a countershaft 228 operatively associated with the fixed displacement motor 230 of steer unit 128 and extending freely through pump 138, sleeve shaft 137 and sleeve shaft 172 to be connected at its left end with a spur gear 232, shafts 137, 172 and 228 being located parallel to shafts 114, 147, 150, 162 and 116. Gear 232 meshes with an idler gear 234 on the left side which gear 234 meshes with a gear 236 connected to the left steer sun gear 218.

Describing now the operation of the FIG. 4 embodiment, in neutral either the forward-drive clutch 165 or the reverse-drive clutch 180 may be engaged and all drive-range-establishing devices are disengaged to disconnect both the hydrostatic and mechanical power flow paths from the output shafts. In neutral, the propulsion pump 148 and the steering pump 138 are motored by the prime mover 110 and the propulsion unit 120 is available for subsequent establishment of the drive ranges and the steer unit 128 is available for subsequent steering which will now be described.

With no propulsion drive to the propulsion power shaft 162 and on conditioning of the hydrostatic steer unit 128 by its pump displacement control 252 to power the shaft 228 in either direction, the steer ring gears 200, 208, since they are connected by the shaft 162, provide reaction in the steer units. One of the steer sun gears 218, 216 is driven in one direction and the other steer sun gear is driven in the opposite direction at the same speed by its gear train connection which includes the steer motor-driven shaft 228 and there is provided true pivot steer about the vehicle's center. When shaft 228 is powered by motor 230 in the forward direction, the right output shaft 114 is driven at a reduced speed in the reverse direction and the left output shaft is driven at this same reduced speed in the forward direction. Converse rotation of the output shafts occurs when shaft 228 is powered in the reverse direction.

In the following descriptional operation of low-, intermediate- and high-drive-range operation the steer unit 128 is conditioned so that shaft 228 is not powered by the steer motor 230, the description of steering operation in all drive ranges being deferred until later. In low-drive range either the forward-drive clutch 165 or the reverse-drive clutch 180 is engaged for reasons which will become more apparent later and the intermediate clutch 175 and high clutch 178 are disengaged to disconnect the mechanical drive paths. The low-drive brake 184 is engaged in the low-drive range to hold carrier 185 and the propulsion motor shaft 150 is powered by control of the propulsion unit pump displacement control 242 to drive the sun gear 151 from zero to maximum motor speed. With the sun gear 151 driven in one direction and the carrier 185 held, the ring gear 158 and connected shaft 162 and steer ring gears 200, 208 are caused to rotate in the opposite direction at a reduced speed. Since the steer sun gears 216, 218 are connected by their gear train, they provide reaction and the steer pinions 202, 210 walk about their steer sun gears to cause the carriers 204, 212 and their connected output shafts to rotate in the same direction at a reduced speed.

During operation in the low-drive range the other sun gear 154 is rotating at motor speed and in the same direction and the carrier 160 is rotating at output speed in the opposite direction and these rotations combine in the gear set 155 to cause the ring gear 193 to rotate at an intermediate speed in the opposite direction. The ratios of the planetary gearing (gear sets 155, 152), the geared drive between the ring gear 193 and intermediate clutch driven member 195 (gears 197, 196) and the geared drive between the input shaft 130 and intermediate-clutch driving member 174 (gears 132, 134, 136) are determined so that when the motor speed reaches its maximum value in the one direction, the clutch driven member 195 of the disengaged intermediate clutch 175 is driven at the same speed and in the same direction as the intermediate-clutch driving member 174 when sleeve shaft 172 is driven in the same direction as the motor shaft 150.

Thus, when the motor shaft 150 is driven, in what is described as the reverse direction, the output shafts 114 and 116 are driven in the forward direction and the intermediate-clutch members are driven in the reverse direction and vice versa. Accordingly, for a low forward drive the hydrostatic propulsion unit 120 is conditioned to power the shaft 150 in the reverse direction and for a low reverse drive the hydrostatic unit 120 is conditioned to power the motor shaft forwardly. In low forward drive the forward-drive clutch 165 is engaged to rotate the shaft 172 and connected intermediate-clutch driving member 174 in the reverse direction to condition the intermediate-drive clutch 175 for a subsequent upshift to intermediate drive. Similarly, in low reverse drive the reverse-drive clutch 180 is engaged to rotate the shaft 172 and connected intermediate-clutch driving member 174 in the forward direction to condition the intermediate-drive clutch 175 for a subsequent upshift to intermediate drive in reverse.

The shift from low to intermediate-drive range in forward and reverse is accomplished when the above synchronous condition of rotational intermediate-drive clutch member speed is reached in low forward drive and low reverse drive, respectively. The low-drive brake 184 is released and the intermediate-drive clutch 175 is then engaged and the gear set 152 becomes passive since it has no reaction. The mechanical drive and hydrostatic drive are now combined in the gear set 155 and by the arrangement of the drive connections of gear set 155, the direction of motor rotation driving the sun gear 154 is opposite the direction of rotation of the carrier 160 and connected propulsion output shaft 162. Thus, the motor drive subtracts from the drive of the carrier 160 and output shafts 114, 116 at the initiation of intermediate drive, the connected steer sun gears 216, 218 providing the reaction in the steer units. Accordingly, the output shaft speed of the steer units in intermediate forward drive with forward-drive clutch 165 engaged is increased by reducing the motor speed to zero to maximum motor speed in the forward direction. Similarly, steer unit output shaft speed in the intermediate reverse-drive range with reverse-drive clutch 180 engaged is increased by reducing motor speed from maximum reverse speed to zero to maximum forward speed. Downshifting from intermediate to low also occurs with synchronous condition in the low-drive brake 184 by the drive to the carrier 185 in intermediate drive.

During operation in the intermediate-drive range the other sun gear 151 is rotating at motor speed and the ring gear 158 is rotating at the same speed and in the same direction as shaft 162 and these rotations combine in the gear set 152 to cause the carrier 185 to rotate at an intermediate speed in the same direction as shaft 162. The ratios of the planetary gearing (gear sets 152, 155) the gearing between carrier 185 and high-clutch driven member 192 (gears 189, 188) and the gearing between the input shaft 130 and high-clutch driving member 176 (gears 132, 134, 136) are determined so that when propulsion motor speed reaches its maximum value in intermediate drive, the high-clutch driven member 192 is driven by carrier 185 at the same speed and in the same direction as the high-clutch driving member 176 when motor shaft 150 is driven in a direction opposite shaft 172.

The shift from intermediate- to high-drive range in forward and reverse is accomplished when the above synchronous condition of rotational high-drive clutch member speed is reached in intermediate forward drive and intermediate reverse drive, respectively. The intermediate clutch 175 is released and the high-drive clutch 178 is then engaged. The mechanical drive and hydrostatic drive is now combined in the gear set 152 and by the arrangement of the drive connections of gear set 152, the direction of motor rotation for the sun gear 151 is the same as that of the ring gear 158 at the initiation of high drive and therefore the motor drive subtracts from the drive of ring gear 158 and shaft 162 at the lowest steer unit output shaft speed in high drive, the connected steer sun gears 216, 218 providing reaction in the steer units. Thus, steer unit output shaft speed in the high forward drive with forward-drive clutch 165 engaged is increased by reducing the motor speed from maximum forward speed to zero to maximum motor speed in the reverse direction. Similarly, steer unit output shaft speed in the high reverse-drive range with reverse-drive clutch 180 engaged is increased by reducing motor speed from maximum forward speed to zero to maximum reverse speed. Downshifting from high to intermediate drive also occurs with a synchronous condition in the intermediate-drive clutch 175 by the drive to the ring gear 193 of gear set 155 in the high-drive range.

Describing now the steering operation, in the low-, intermediate- and the high-drive ranges and in either forward or reverse, steering of the differential type is accomplished by control of the steer controls 250, 252 to condition the motor 230 to drive the shaft 228. With shaft 228 now being driven in either the forward or reverse direction, the steer sun gears 216, 218, which provided only reaction in the drive ranges, are now caused to rotate in opposite directions at the same speed whereby the steer unit output shafts are caused to rotate at differential speeds. For example, when the right steer sun gear 216 is caused to be driven in the same direction as the right steer ring gear 200 by the motor 230, it adds to the output drive by the steer ring gear 200 to increase the speed of the right output shaft 114 while the other steer sun gear 218 subtracts from the drive of its steer ring gear 208 to decrease the speed of output shaft 116 by the same amount that the speed of shaft 114 has been increased.

Thus, the FIG. 4 embodiment in addition or providing full hydrostatic drive in the low-drive range and split torque drive in the intermediate- and high-drive range with full reverse operation in addition provides infinitely variable geared differential steering in all drive ranges.

The power train of this invention has been disclosed for use in a track-laying vehicle having dual outputs and it will be appreciated that the power train can also be applied to a vehicle requiring only single transmission output such as in a heavy duty wheeled vehicle by utilizing only one of the available outputs.

The above-described preferred embodiments are illustrative of the invention which may be modified within the scope of the appended claims.

What I claim is:

1. In a power train the combination of an input shaft; an output shaft; a speed differential gear unit operatively connected to said output shaft for driving said output shaft with single-input drive and also for driving said output shaft with dual-input drive at a speed proportional to the speed difference of the dual-input drive; first drive-transmitting means including hydrostatic drive means comprising a pump and a motor for transmitting drive from said input shaft to said gear unit to provide one input drive for said gear unit; second drive-transmitting means for transmitting drive from said input shaft to said gear unit to provide another input drive for said gear unit for cooperating with said one-input drive to provide dual-input drive for said gear unit; said second drive-transmitting means including synchronous drive-establishing means operable to provide and to establish and disestablish said other drive under synchronous conditions at a predetermined motor speed; said gear unit comprising a pair of planetary gear sets having like gear members connected to said motor and said drive-establishing means including a clutch for transmitting said other drive to the ring gear member of one gear set.

2. In a power train the combination of an input shaft; an output shaft; a speed differential gear unit operatively connected to said output shaft for driving said output shaft with single-input drive and also for driving said output shaft with dual-input drive at a speed proportional to the speed difference of the dual-input drive; first drive-transmitting means including hydrostatic drive means comprising a pump and a motor for transmitting drive from said input shaft to said gear unit to provide one-input drive for said gear unit; second drive-transmitting means for transmitting drive from said input shaft to said gear unit to provide another input drive for said gear unit for cooperating with said one-input drive to provide dual-input drive for said gear unit and said second drive-transmitting means including synchronous drive-establishing means operable to provide and to establish and disestablish said other drive under synchronous conditions at a predetermined motor speed; said gear unit comprising a pair of planetary gear sets having like gear members connected to said motor and said drive-establishing means including a clutch for transmitting said other drive to the carrier member of one gear set and a clutch for transmitting said other drive to the ring gear member of the other gear set.

3. In a power train the combination of an input shaft; an output shaft; hydrostatic drive means including a pump operatively connected to said input shaft and a motor operatively connected to said pump; a power-combining planetary gear unit for connecting said motor to said output shaft including a first planetary gear set having an input member, a reaction member and an output member and a second planetary gear set having a pair of input members and an output member, both of said output members being connected to said output shaft, the input member of said first gear set and one input member of said second gear set being connected to said motor so that when said reaction member is held and said motor is driven in one direction from zero motor speed to a maximum motor speed said output shaft is driven at a reduced speed by said first gear set with hydrostatic input drive to its input member to provide a first drive range and at the same time the other input member of said second gear set is also driven; mechanical drive means for selectively connecting said input shaft to said other input member of said second gear set including a clutch having a driving clutch member and a driven clutch member and drive train means providing a speed ratio between said motor and said driven clutch member for causing said driven clutch member to rotate at driving clutch member speed and in the same direction at the maximum motor speed in said one direction whereby on clutch engagement at maximum motor speed in said one direction synchronous clutch engagement occurs and on subsequent decrease at motor speed through zero to maximum motor speed in the opposite direction said output shaft is driven at a proportionately increased speed by said second gear set with hydrostatic drive to said one input member of said second gear set and mechanical drive to said other input member of said second gear set to provide a second and higher drive range; said first gear set having a sun gear providing said input member, a ring gear providing said output member, a carrier providing said reaction member and having pinions meshing with said sun gear and ring gear, a brake for holding said carrier and said second gear set having a sun gear providing said one input member, a ring gear providing said other input member, a carrier providing said output member and having pinions meshing with said sun gear and ring gear.

4. In a power train the combination of an input shaft; an output shaft; hydrostatic drive means including a pump operatively connected to said input shaft and a motor operatively connected to said pump; a power-combining planetary gear unit for connecting said motor to said output shaft including a first planetary gear set having an input member, a reaction member and an output member and a second planetary gear set having a pair of input members and an output member, both of said output members being connected to said output shaft, the input member of said first gear set and one input member of said second gear set being connected to said motor so that when said reaction member is held and said motor is driven in one direction from zero motor speed to a maximum motor speed said output shaft is driven at a reduced speed by said first gear set with hydrostatic input drive to its input member to provide a first drive range and at the same time the other input member of said second gear set is also driven and mechanical drive means for selectively connecting said input shaft to said other input member of said second gear set including a clutch having a driving clutch member and a driven clutch member and drive train means providing a speed ratio between said motor and said driven clutch member for causing said driven clutch member to rotate at driving clutch member speed and in the same direction at the maximum motor speed in said one direction whereby on clutch engagement at maximum motor speed in said one direction synchronous clutch engagement occurs and on subsequent decrease in motor speed through zero to maximum motor speed in the opposite direction said output shaft is driven at a proportionately increased speed by said second gear set with hydrostatic drive to said one input member of said second gear set and mechanical drive to said other input member of said second gear set to provide a second and higher drive range; said first gear set having a sun gear providing said input member, a ring gear providing said reaction member and also being capable of providing another input member for said first gear set, a carrier providing said output member and having pinions meshing with said sun gear and ring gear, a brake for holding said ring gear, said second gear set having a sun gear providing said one input member, a ring gear providing said output member, a carrier providing said other input member and having pinions meshing with said sun gear and ring gear, mechanical drive means for selectively connecting said input shaft to said ring gear of said first gear set including a clutch having a driving clutch member and a driven clutch member and drive train means providing a speed ratio for causing said driven clutch member to rotate at driving clutch member speed and in the same direction at the maximum motor speed in said opposite direction whereby on clutch engagement at maximum motor speed in said opposite direction synchronous clutch engagement occurs and on subsequent decrease in motor speed through zero to maximum positive motor speed in said one direction said output shaft is driven at a proportionately increased speed by said first gear set with hydrostatic drive to said sun gear of said first gear set and mechanical drive to said ring gear of said first gear set to provide a third and higher drive range.

5. In a power train the combination of an input shaft; an output shaft; hydrostatic drive means including a pump operatively connected to said input shaft and a motor operatively connected to said pump; a power-combining planetary gear unit for connecting said motor to said output shaft including a first planetary gear set having an input member, a reaction member and an output member and a second planetary gear set having a pair of input members and an output member, both of said output members being connected to said output shaft, the input member of said first gear set and one input member of said second gear set being connected to said motor so that when said reaction member is held and said motor is driven in one direction from zero motor speed to a maximum motor speed said output shaft is driven at a reduced speed by said first gear set with hydrostatic input drive to its input member to provide a first drive range and at the same time the other input member of said second gear set is also driven and mechanical drive means for selectively connecting said input shaft to said other input member of said second gear set including a clutch having a driving clutch member and a driven clutch member and drive train means providing a speed ratio between said motor and said driven clutch member for causing said driven clutch member to rotate at driving clutch member speed and in the same direction at the maximum motor speed in said one direction whereby on clutch engagement at maximum motor speed in said one direction synchronous clutch engagement occurs and on subsequent decrease in motor speed through zero to maximum motor speed in the opposite direction said output shaft is driven at a proportionately increased speed by said second gear set with hydrostatic drive to said one input member of said second gear set and mechanical drive to said other input member of said second gear set to provide a second and higher drive range; mechanical drive means for selectively connecting said input shaft to said reaction member of said first gear set including a clutch having a driving clutch member and a driven clutch member and drive train means providing a speed ratio between said driven clutch member and said motor for causing said driven clutch member to rotate at driving clutch member speed and in the same direction at the maximum motor speed in said opposite direction whereby on clutch engagement at maximum motor speed in said opposite direction synchronous clutch engagement occurs and on subsequent decrease in motor speed through zero to maximum positive motor speed in said one direction said output shaft is driven at a proportionately increased speed by said first gear set with hydrostatic drive to said input member of said first gear set and mechanical drive to said reaction member of said first gear set to provide a third and higher drive range.

6. In a power train the combination of an input shaft; an output shaft; hydrostatic drive means including a pump operatively connected to said input shaft and a motor operatively connected to said pump; a power-combining planetary gear unit for connecting said motor to said output shaft including a first planetary gear set having an input member, a reaction member and an output member and a second planetary gear set having a pair of input members and an output member, both of said output members being connected to said output shaft, the input member of said first gear set and one input member of said second gear set being connected to said motor so that when said reaction member is held and said motor is driven in one direction from zero motor speed to a maximum motor speed said output shaft is driven at a reduced speed by said first gear set with hydrostatic input drive to its input member to provide a first drive range and at the same time the other input member of said second gear set is also driven and mechanical drive means for selectively connecting said input shaft to said other input member of said second gear set including a clutch having a driving clutch member and a driven clutch member and drive train means providing a speed ratio between said motor and said driven clutch member for causing said driven clutch member to rotate at driving clutch member speed and in the same direction at the maximum motor speed in said one direction whereby on clutch engagement at maximum motor speed in said one direction synchronous clutch engagement occurs and on subsequent decrease in motor speed through zero to maximum motor speed in the opposite direction said output shaft is driven at a proportionately increased speed by said second gear set with hydrostatic drive to said one input member of said second gear set and mechanical drive to said other input member of said second gear set to provide a second and higher drive range; said first gear set having a sun gear providing said input member, a ring gear providing said output member, a carrier providing said reaction member and having pinions meshing with said sun gear and ring gear, a brake for holding said carrier, said second gear set having a sun gear providing said one input member, a ring gear providing said other input member, a carrier providing said output member and having pinions meshing with said sun gear and ring gear; mechanical drive means for selectively connecting said input shaft to said carrier of said first gear set including a clutch having a driving clutch member and a driven clutch member and drive train means providing a speed ratio for causing said driven clutch member to rotate at driving clutch member speed and in the same direction at the maximum motor speed in said opposite direction whereby on clutch engagement at maximum motor speed in said opposite direction synchronous clutch engagement occurs and on subsequent decrease in motor speed through zero to maximum positive motor speed in said one direction said output shaft is driven at a proportionately increased speed by said first gear set with hydrostatic drive to said sun gear of said first gear set and mechanical drive to said carrier of said first gear set to provide a third and higher drive range.

7. In a power train the combination of an input shaft; a right and a left output shaft; a right and a left planetary gear unit each having a pair of planetary gear sets, each said gear set having a sun gear, a ring gear and a carrier with pinions meshing with said sun and ring gear, one of said ring gears and one of said carriers of said left and right gear unit being connected to said left and right output shaft respectively, a left and a right low-drive brake for holding the other carrier of said left and right gear unit respectively; a mechanical drive for connecting said input shaft to both of the other ring gears and including a power transfer shaft, forward-drive means including a forward-drive clutch and reverse-drive means including a reverse-drive clutch for selectively connecting said input shaft to said power transfer shaft, a left and a right high-drive clutch for connecting said power transfer shaft to said other ring gear of said left and right gear unit respectively and a left and a right infinitely variable hydraulic drive operatively connecting said input shaft to said left and right gear unit respectively, said left and right hydraulic drive comprising a left and a right pump operatively connected to said input shaft, a left and a right motor hydraulically connected to said left and right pump respectively, said left and right motor being connected to drive both said sun gears of said left and right gear unit respectively.

8. In a power train the combination of an input shaft; a right and left output shaft; a right and a left planetary gear unit each having a pair of planetary gear sets; each said gear set having a sun gear, a ring gear and a carrier with pinions meshing with said sun and ring gear, one of said ring gears and one of said carriers of said left and right gear unit being connected to said left and right output shaft respectively, a left and a right low-drive brake for holding the other ring gear of said left and right gear unit respectively; a mechanical drive for selectively connecting said input shaft to both of the other ring gears and both of the other carriers and including a power transfer shaft, forward-drive means including a forward-drive clutch and reverse-drive means including a reverse-drive clutch for selectively connecting said input shaft to said power transfer shaft, a left and a right intermediate-drive clutch for connecting said power transfer shaft to said other carrier of said left and right gear unit respectively, a left and a right high-drive clutch for connecting said power transfer shaft to said other ring gear of said left and right gear unit respectively; and a left and a right infinitely variable hydraulic drive operatively connecting said input shaft to said left and right gear unit respectively, said left and right hydraulic drive comprising a left and a right pump operatively connected to said input shaft, a left and a right motor hydraulically connected to said left and right pump respectively, said left and right motor being connected to drive both said sun gears of said left and right gear unit respectively.